US012539466B2

(12) United States Patent
Arnell et al.

(10) Patent No.: US 12,539,466 B2
(45) Date of Patent: *Feb. 3, 2026

(54) METHOD AND APPARATUS FOR PROVIDING A COMPUTER IMPLEMENTED GAME

(71) Applicant: KING.COM LIMITED, St. Julians (MT)

(72) Inventors: Niklas Arnell, Stockholm (SE); Sashank Vandrangi, Stockholm (SE); Mikhail Kharlamov, Stockholm (SE); Ida Nilsson, Stockholm (SE)

(73) Assignee: KING.COM LIMITED, St. Julian's (MT)

( * ) Notice: Subject to any disclaimer, the term of this patent is extended or adjusted under 35 U.S.C. 154(b) by 239 days.

This patent is subject to a terminal disclaimer.

(21) Appl. No.: 18/456,594

(22) Filed: Aug. 28, 2023

(65) Prior Publication Data

US 2025/0073585 A1 Mar. 6, 2025

Related U.S. Application Data

(63) Continuation of application No. 17/333,436, filed on May 28, 2021, now Pat. No. 11,918,915.

(51) Int. Cl.

| | |
|---|---|
| ***A63F 13/67*** | (2014.01) |
| ***A63F 13/44*** | (2014.01) |
| ***A63F 13/46*** | (2014.01) |
| ***A63F 13/537*** | (2014.01) |
| ***A63F 13/55*** | (2014.01) |
| ***A63F 13/69*** | (2014.01) |

(52) U.S. Cl.

CPC .............. *A63F 13/67* (2014.09); *A63F 13/44* (2014.09); *A63F 13/46* (2014.09); *A63F 13/537* (2014.09); *A63F 13/55* (2014.09); *A63F 13/69* (2014.09); *A63F 2300/5553* (2013.01); *A63F 2300/638* (2013.01)

(58) Field of Classification Search

CPC .......... A63F 13/67; A63F 13/44; A63F 13/46; A63F 13/537; A63F 13/55; A63F 13/69; A63F 13/60; A63F 2300/5553; A63F 2300/638

See application file for complete search history.

(56) References Cited

U.S. PATENT DOCUMENTS

2013/0260847 A1 10/2013 Amaitis et al.
2014/0080600 A1 3/2014 Knutsson et al.

OTHER PUBLICATIONS

Super Mario Bros. 3, Strategywiki found at < URL https://strategywiki.org/wiki/Super_Mario_Bros._3/Walkthrough > ; Retrieved on Nov. 26, 2022; 1990.

*Primary Examiner* — Kevin Y Kim
(74) *Attorney, Agent, or Firm* — Holzer Patel Drennan

(57) ABSTRACT

A computer device provides a computer implemented game. Different levels of the computer implemented game are displayed. A game starting at one of the levels and being with a plurality of other players is provided. The game challenge require the completion of a plurality of consecutive levels of the levels. If the player or another other player fails to complete a level, the player or other player is removed from the game challenge. As the player progresses through the levels information about a remaining number of the plurality of players in the game challenge is displayed.

20 Claims, 14 Drawing Sheets

610

601

602

660

656 658 654 650

METHOD AND APPARATUS FOR PROVIDING A COMPUTER IMPLEMENTED GAME

CROSS-REFERENCE TO RELATED APPLICATIONS

This application is a continuation of U.S. application Ser. No. 17/333,436, filed May 28, 2021, the entire contents of which being fully incorporated herein by reference.

FIELD OF THE INVENTION

Embodiments of this application relate to a user device and a server for use in playing a computer implemented game.

Some embodiments may relate to engaging users or players in a computer game executable in an online environment.

The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how, for example, the user interface is to be controlled in the context of computer devices available to play the game.

One technical challenge can involve allowing a game to be fun and compelling even when there is limited display resource available, such as when a game is being played on a smartphone, tablet, or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

Another technical challenge is how to retain casual game play where a user is able to play a game as and when they like while at the same time having an aspect which involves interaction with one or more other players.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear.

An existing type of match-three game is a so-called "switcher" game. In a switcher game, the player switches the place of two adjacent game elements on the game board so that one or both of them create a chain of at least three adjacent game elements of the same type. Those matched game elements will then disappear. The game board is then repopulated with game elements. One such known match three-type switcher game is known by the trademark Candy Crush Saga.

Another known type of game is "linker game", where a sequence of game elements sharing a matching characteristic are linked and removed from the game board.

Another example are the so called 'clicker' games where the player can click on a group of adjacent game elements of a certain type and those game element will then be removed. Some clicker games only require two adjacent elements to remove those elements if clicked by the user. Others may require more than two. To play the game, the user will, via a user interface, click on any group of two or more touching blocks satisfying a criteria. The criteria may be that the blocks share a matching characteristic. New blocks may or may not appear on the game board. The remaining game element blocks may drop down to fill gaps on the game board.

This patent specification describes not only various ideas and functions, but also their creative expression. A portion of the disclosure of this patent document therefore contains material to which a claim for copyright is made and notice is hereby given: Copyright King.com Limited 2021 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to some embodiments, there is provided a computer device configured to provide a computer implemented game, the computer device comprising a display, a user interface, at least one memory, and at least one processor wherein: the at least one processor is configured to cause the display to display a plurality of different levels of the computer implemented game including a current level of the player, at least one of the plurality of different levels being a level of the computer implemented game which has yet to be completed, wherein each level has a goal which when completed allows progress to a next one of the plurality of levels;

- the at least one processor is configured to determine that a game challenge is to be provided, the game challenge starting at one of the plurality of different levels and being with a plurality of other players, the game challenge requiring the completion of a plurality of consecutive levels of the plurality of levels, wherein if the player or a respective other player fails to complete a level of the plurality of consecutive levels, the player or respective other player is removed from the game challenge; the at least one processor is configured to determine as the player progresses through the plurality of consecutive levels information about a remaining number of the plurality of players in the game challenge; and the at least one processor is configured to cause the display to display information about the remaining number of the plurality of other players.

The at least one processor may be configured to cause an indication to be displayed on the display indicating the one of the plurality of levels at which the game challenge starts.

The at least one processor may be configured to cause an indication to be displayed on the display indicating one of the plurality of levels at which the game challenge ends.

The at least one processor may be configured to cause an indication to be displayed on the display indicating which one or more of the plurality of consecutive levels of the game challenge is associated with an in game reward The one of the plurality of levels at which the game challenge starts may be ahead of the current level of the player.

The game challenge option may have a limited availability.

The game challenge option may be available for a limited amount of time.

The at least one processor may be configured to determine that the player has reached the one of the plurality of levels at which the game challenge starts while the game challenge options is still available and in response to provide the player with a game challenge associated with the game challenge option.

The at least one processor may be configured to determine that the player has reached the one of the plurality of levels at which the game challenge starts while the game challenge options is still available and in response to provide the player with an option to play a game challenge associated with the game challenge option.

A number of levels in the plurality of consecutive levels required to be completed in the game challenge may be dependent on a respective difficulty associated with the each of level of the plurality of consecutive levels.

At least one level of the plurality of consecutive levels of the game challenge may be associated with an in game reward, such that if the at least one processor determines that the player has completed one of the levels of the plurality of consecutive levels of the game challenge associated with a reward, the at least one processor may be configured to provide that in game reward.

The at least one processor may be configured to receive data associated with playing of the game by the plurality of other players, previous to the playing of the game challenge.

The at least one processor may be configured to use the received data to determine when one or more of the plurality of other players fails a respective level of the plurality of consecutive levels.

The at least one processor may be configured to cause the display to display at an end of a level of the plurality of consecutive levels, information about one or more of the other players.

The at least one processor may be configured to cause the display to display at an end of a level of the plurality of consecutive levels, information about one or more of the other players when the number of other players is below a given number.

The at least one processor may be configured to determine, when the player has successfully completed each of the plurality of consecutive levels of the game challenge an in game reward for the player, the in game reward being dependent on a number of the other players who have also successfully completed each of the plurality of consecutive levels of the game challenge.

The at least one processor may be configured to determine, when the player has successfully completed each of the plurality of consecutive levels of the game challenge an in game reward for the player, the in game reward being dependent on a difficulty of one or more of the plurality of consecutive levels of the game challenge.

According to another aspect, there is provided a computer method providing a computer implemented game, the method being provided by a computer device configured to provide the computer implemented game and comprising a display, a user interface, at least one memory, and at least one processor, the method comprising: causing, by the at least one processor, the display to display a plurality of different levels of the computer implemented game including a current level of the player, at least one of the plurality of different levels being a level of the computer implemented game which has yet to be completed, wherein each level has a goal which when completed allows progress to a next one of the plurality of levels; determining, by the at least one processor, that a game challenge is to be provided, the game challenge starting at one of the plurality of different levels and being with a plurality of other players, the game challenge requiring the completion of a plurality of consecutive levels of the plurality of levels, wherein if the player or a respective other player fails to complete a level of the plurality of consecutive levels, the player or respective other player is removed from the game challenge; determining, by the at least one processor, information about a remaining number of the plurality of other player s in the game challenge as the player progresses through the plurality of consecutive levels; and causing, by the at least one processor, the display to display information about the remaining number of the plurality of other players.

The method may comprise causing, by the at least one processor, an indication to be displayed on the display indicating the one of the plurality of levels at which the game challenge starts.

The method may comprise causing, by the at least one processor, an indication to be displayed on the display indicating one of the plurality of levels at which the game challenge ends.

The method may comprise causing, by the at least one processor, an indication to be displayed on the display indicating which one or more of the plurality of consecutive levels of the game challenge is associated with an in game reward.

The one of the plurality of levels at which the game challenge starts may be ahead of the current level of the player.

The game challenge option may have a limited availability.

The game challenge option may be available for a limited amount of time.

The method may comprise determining, by the at least one processor, that the player has reached the one of the plurality of levels at which the game challenge starts while the game challenge options is still available and in response to provide the player with a game challenge associated with the game challenge option.

The method may comprise determining, by the at least one processor, that the player has reached the one of the plurality of levels at which the game challenge starts while the game challenge options is still available and in response to provide the player with an option to play a game challenge associated with the game challenge option.

A number of levels in the plurality of consecutive levels required to be completed in the game challenge may be dependent on a respective difficulty associated with the each of level of the plurality of consecutive levels.

At least one level of the plurality of consecutive levels of the game challenge may be associated with an in game reward, such that the method may comprise determining, by the at least one processor, if the player has completed one of the levels of the plurality of consecutive levels of the game challenge associated with a reward, and if so, providing that in game reward.

The method may comprise receiving, by a receiver of the computer device, data associated with playing of the game by the plurality of other players, previous to the playing of the game challenge.

The method may comprise using, by the at least one processor, the received data to determine when one or more of the plurality of other players fails a respective level of the plurality of consecutive levels.

The method may comprise causing, by the at least one processor, the display to display at an end of a level of the plurality of consecutive levels, information about one or more of the other players.

The method may comprise, causing, by the at least one processor, the display to display at an end of a level of the plurality of consecutive levels, information about one or more of the other players when the number of other players is below a given number.

The method may comprise determining, by the at least one processor, when the player has successfully completed each of the plurality of consecutive levels of the game challenge an in game reward for the player, the in game reward being dependent on a number of the other players who have also successfully completed each of the plurality of consecutive levels of the game challenge.

The method may comprise determining, by the at least one processor, when the player has successfully completed each of the plurality of consecutive levels of the game challenge an in game reward for the player, the in game reward being dependent on a difficulty of one or more of the plurality of consecutive levels of the game challenge.

According to another aspect, there is provided a non-transitory computer program product comprising instructions which, when implemented by the at least one processor, cause a computer device to be configured to provide a computer implemented game, the at least one processor being configured to: cause, a display of the computer device to display a plurality of different levels of the computer implemented game including a current level of the player, at least one of the plurality of different levels being a level of the computer implemented game which has yet to be completed, wherein each level has a goal which when completed allows progress to a next one of the plurality of levels; determine that a game challenge is to be provided, the game challenge starting at one of the plurality of different levels and being with a plurality of other players, the game challenge requiring the completion of a plurality of consecutive levels of the plurality of levels, wherein if the player or a respective other player fails to complete a level of the plurality of consecutive levels, the player or respective other player is removed from the game challenge; determine information about a remaining number of the plurality of other player s in the game challenge as the player progresses through the plurality of consecutive levels; and cause the display to display information about the remaining number of the plurality of other players.

According to another aspect, there is provided a computer device configured to provide a computer implemented game, the computer device comprising a display, a user interface, at least one memory, and at least one processor wherein: the at least one processor is configured to cause the display to display a plurality of different levels of the computer implemented game including a current level of the player, at least one of the plurality of different levels being a level of the computer implemented game which has yet to be completed, wherein each level has a goal which when completed allows progress to a next one of the plurality of levels; the at least one processor is configured to determine that a game challenge option is to be provided to a player, the game challenge option having a limited availability and being associated with a first level, the first level being one of the at least one of the plurality of different levels which has yet to be completed; the at least one processor is configured to, in response to determining that game challenge option is to be provided to the player, cause the display to display in association with the first level an indication of the availability of the game challenge option; the at least one processor is configured to determine that the player of the computer implemented game has reached the first level while the game challenge option is still available; and the at least one processor is configured, in response to determining that the player has reached the first level while the game challenge option is still available, to provide the player with an option to play a game challenge associated with the game challenge option.

The game challenge comprises a game challenge in which the player plays with or against one or more different players.

The game challenge option is available for a limited amount of time.

According to another aspect, there is provided a computer method providing a computer implemented game, the method being provided by a computer device configured to provide the computer implemented game and comprising a display, a user interface, at least one memory, and at least one processor, the method comprising: causing, by the at least one processor, the display to display a plurality of different levels of the computer implemented game including a current level of the player, at least one of the plurality of different levels being a level of the computer implemented game which has yet to be completed, wherein each level has a goal which when completed allows progress to a next one of the plurality of levels; determining, by the at least one processor, that a game challenge option is to be provided to a player, the game challenge option having a limited availability and being associated with a first level, the first level being one of the at least one of the plurality of different levels which has yet to be completed; in response to determining that game challenge option is to be provided to the player, causing, by the at least one processor, the display to display in association with the first level an indication of the availability of the game challenge option; determining, by the at least one processor, that the player of the computer implemented game has reached the first level while the game challenge option is still available; and in response to determining that the player has reached the first level while the game challenge option is still available, providing, by the at least one processor, the player with an option to play a game challenge associated with the game challenge option.

The game challenge comprises a game challenge in which the player plays with or against one or more different players.

The game challenge option is available for a limited amount of time.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which.

DETAILED DESCRIPTION OF SOME EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement embodiments in a number of variations.

One example of a game with which embodiments may be used is a ‘match-3 game’ where the player is required to find patterns on a seemingly chaotic board. The player then has to match three or more of the same type of game element on the game board and those matched elements will then disappear. In some games the user has to match more than 3 game elements.

Figure 1A:
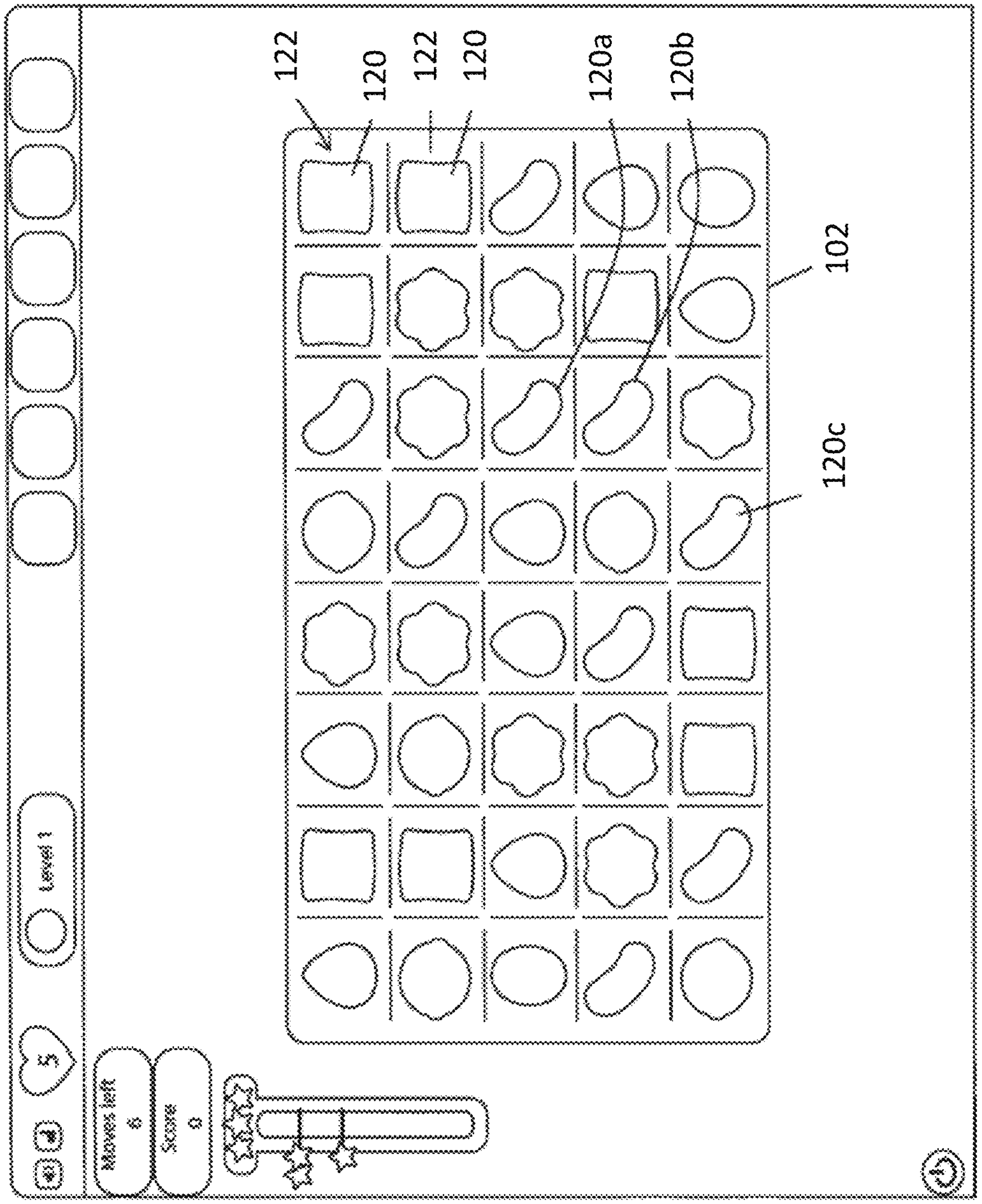
FIG. 1*a* shows a first example embodiment of a game board.

FIG. 1*a* shows a display of a known version of a match 3 switcher game called Candy Crush Saga™. FIG. 1*a* illustrates a game board 102 with a plurality of game elements 120. The game elements are each of six different shapes and colours. Of course, in other embodiments, there may be more or less than six different game elements. Each game element type may be defined by one or more of particular matching characteristics, for example a particular shape and colour combination. Each game element is supported by a tile 122. The tiles may not be readily visible to a player of the game—the game elements are the main focus for a player. However, the tiles govern characteristics of the game elements which are visible to a player.

In the known version of the match 3 switcher game, the aim of the game is to swap game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 1*a* that game element 120*c* is moved one place to the right to form a three-line match with game elements 120*a* and 120*b*. This has the effect of removing game elements 120*a*, 120*b* and 120*c*", creating a visual effect (for example an animation) on the screen to indicate the removal of the game elements. The two game elements which were directly above game elements 120*a* will now fall downwards into the spaces created by the removal of game elements 120*a*, 120*b* and 120*c*. The game elements on the newly created tiles which fall downwards into the game board are generated at random. The user then has a new game board on which to play a subsequent move.

Game elements may drop down from the top of the game board. In an alternative version the physics can vary so that the speed and/or direction of replacement game elements can alter. For example, the game board may be filled from below and/or from the sides. It should be appreciated that any suitable mechanism may be used to replace game elements which are removed from the game board as a result of a match being made.

Other examples of a casual social game are the so called ‘clicker’ games where the player can click on a group of adjacent game elements of a certain type and those will then be removed. Some clicker games only require two adjacent objects to remove those elements if clicked by the user. Others may require more than two.

Figure 1B:
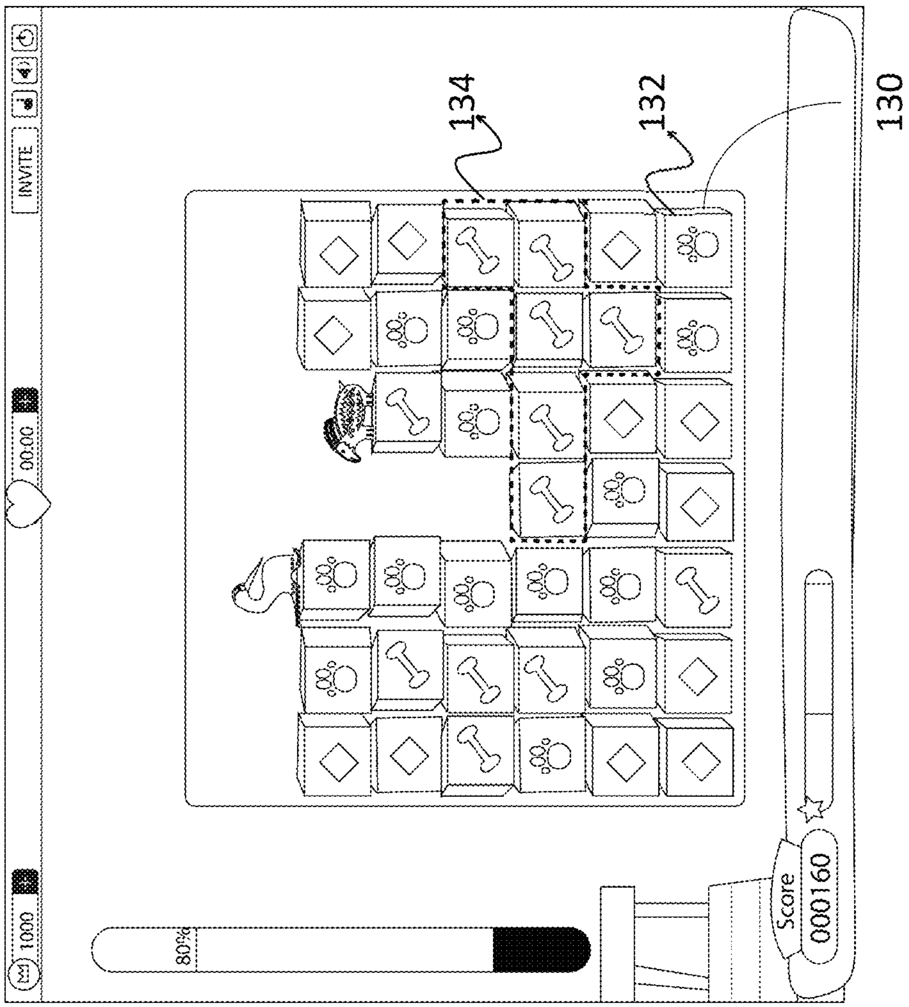
FIG. 1*b* shows a second example embodiment of a game board.

FIG. 1*b* shows a display of a known version of a clicker game called Pet Rescue™. FIG. 1*b* illustrates a game board 130 with a plurality of game elements or blocks 132.

To play the game, the user will, via a user interface, click on any group of two or more touching blocks of the same colour. In the example shown in FIG. 1*b*, the user has clicked on the group referenced 134 and surrounded by dotted lines. Clicking on this group will cause these blocks to be removed from the game board. In some embodiments, new blocks will not appear on the game board. The remaining game element blocks drop down and slide left to fill gaps on the game board. There may be elements blocking the game elements to fall down or slide left and the game designer may implement certain rules for certain game elements.

Another type of match game are the so called 'shooter' games where the player launches for example a ball or bubble on to the game board trying to aim at groups of similar game elements already on the game board. If the launched ball hits or forms a group of more than 3 similar game elements then that group of game elements are removed from the game board.

Other embodiments may be used with any other suitable type of games. The previously described games are by way of example only.

In some embodiments, the game may be provided with different levels. Each level may have a specific goal. This will be discussed in more detail later.

Figure 2:
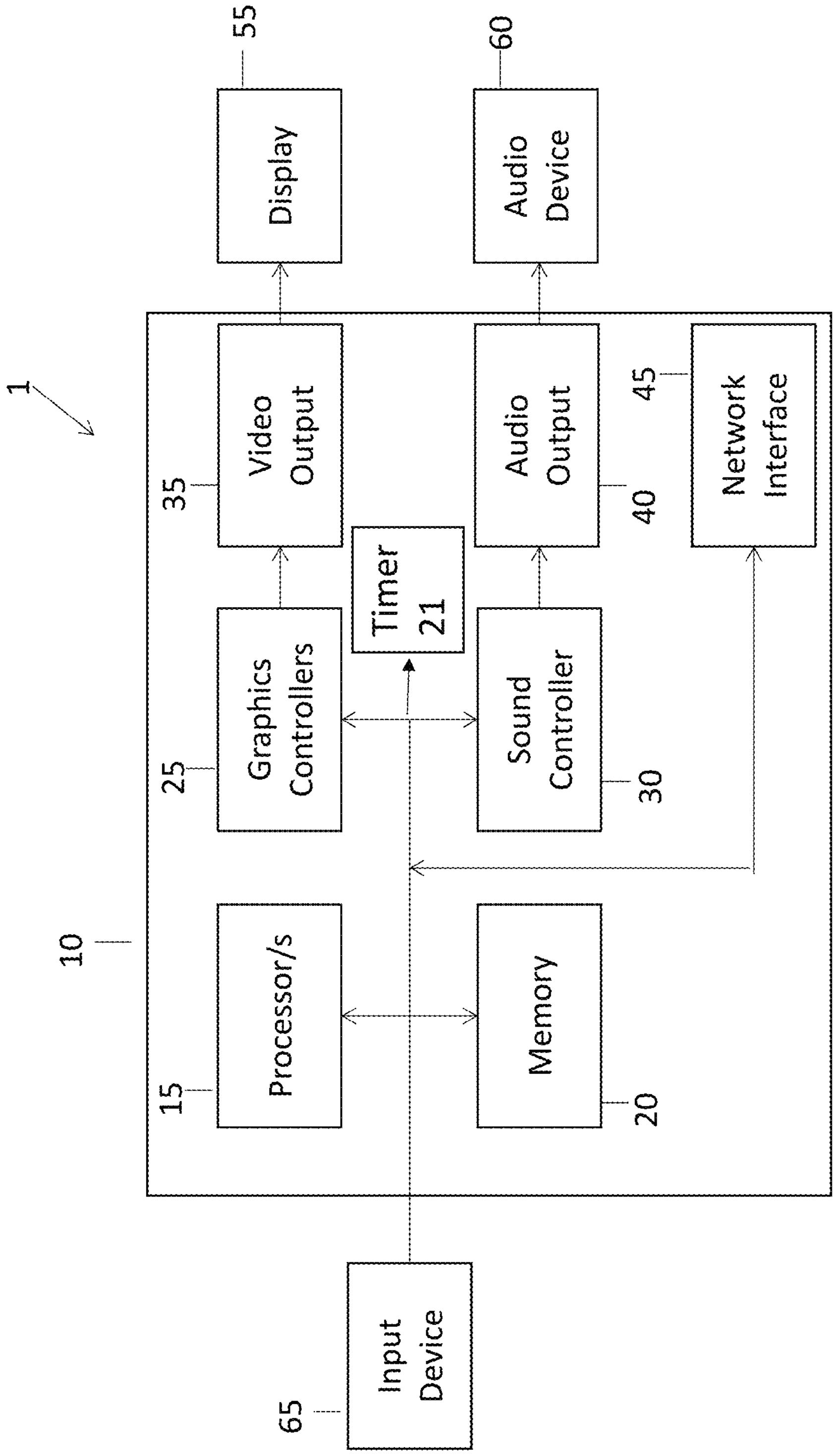
FIG. 2 shows an example user device in which some embodiments may be provided.

A schematic view of a user device 1 which may be configured to provide one or more embodiments is shown in FIG. 2. The user device may be configured to provide a computer implemented game. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may comprise one or more processor and/or be provided by the one or more processors 15. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

A timer 21 may be provided. The timer may be a hardware function, a software function, or a combination thereof. The timer may be provided by the at least one processor, in some embodiments. The timer may provide a count up function and/or a countdown function.

The control part 10 has an interface 45 allowing the device to be able to communicate with a network such as the Internet or other communication infrastructure.

The device 1 has an input device or user interface 65. The input device can take any suitable format and can be one or more of a keyboard, mouse, touch screen, joystick, or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

The user device may be a so-called smart phone or tablet. In some embodiments, the user device may be relatively small with a relatively small touch screen.

Figure 3:
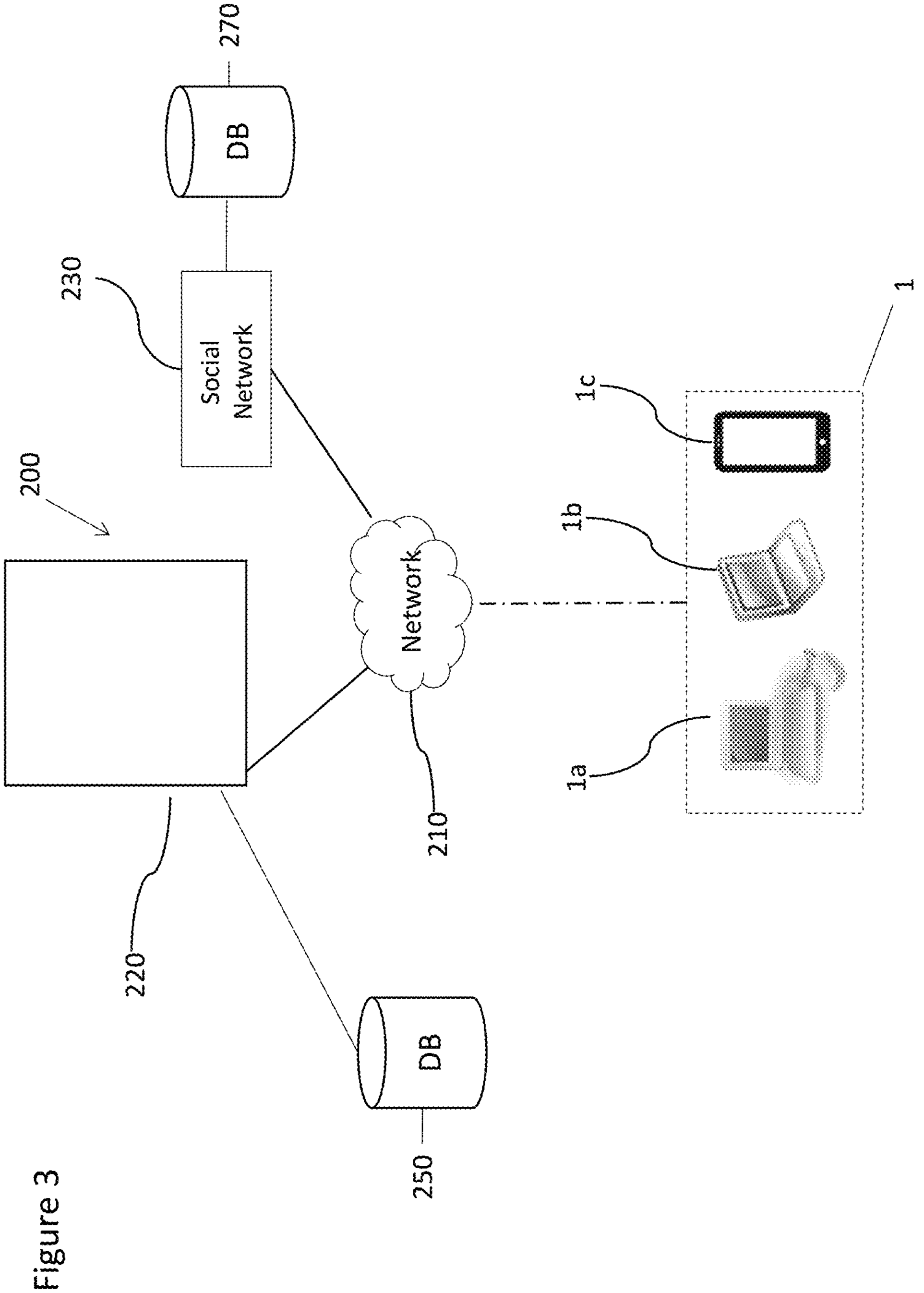
FIG. 3 shows an example system in which some embodiments may be provided.

FIG. 3 schematically shows a system 200 according to an embodiment. The system 200 comprises a server 220 which may store or be in communication with database 250 which may, in some embodiments, store game player's details, profiles, statistics etc. In practice, one or more databases 250 may be provided. In practice, one or more servers 220 may be provided. Where one or more server is provided, the database(s) 250 may be provided in one database 250 across two or more servers.

The server 220 may communicate via, for instance, the internet 210 to one or more client or user devices 1, shown in FIG. 3 by way of example as user devices 1*a*, 1*b* and 1*c*. The server 220 may have connections to a social network 230, for example, Facebook™. The connections may be via the network or via a direct connection. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of part of the database 270 being made on the user device 1.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices. The data which is fed back may also allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

The game may be played in an offline mode on a handheld device using locally stored information on the handheld device. The device may store all or some of the levels that are available as applicable to the particular game and its saga or mission objectives. Some of the features may be locally executed on the device. This may for instance implement a scheme to regenerate lives after a certain period of time, the time may be locally decided based on the clock on the device. In some embodiments, the central game server clock may override the local clock when the local device has been synchronised with the server.

Some embodiments may be provided in the context of so-called saga or similar games. These are games which have one or more levels. In some games, a user may be required to complete a certain level before the user is able to progress to a next level. In some embodiments, the user may be able to go back and play any previous level. A game may have a number of different levels. Different levels may have different requirements to be met. For example, some levels may have one or more specific goals. These goals could be to reach a certain amount of points before running out of moves or time; to bring down certain game elements to the bottom of the screen; to remove a certain amount of game elements before running out of moves or to collect certain game elements through specific matches before running out of moves. These are by of example only, and any other additional or alternative goals may be provided.

Figure 4:
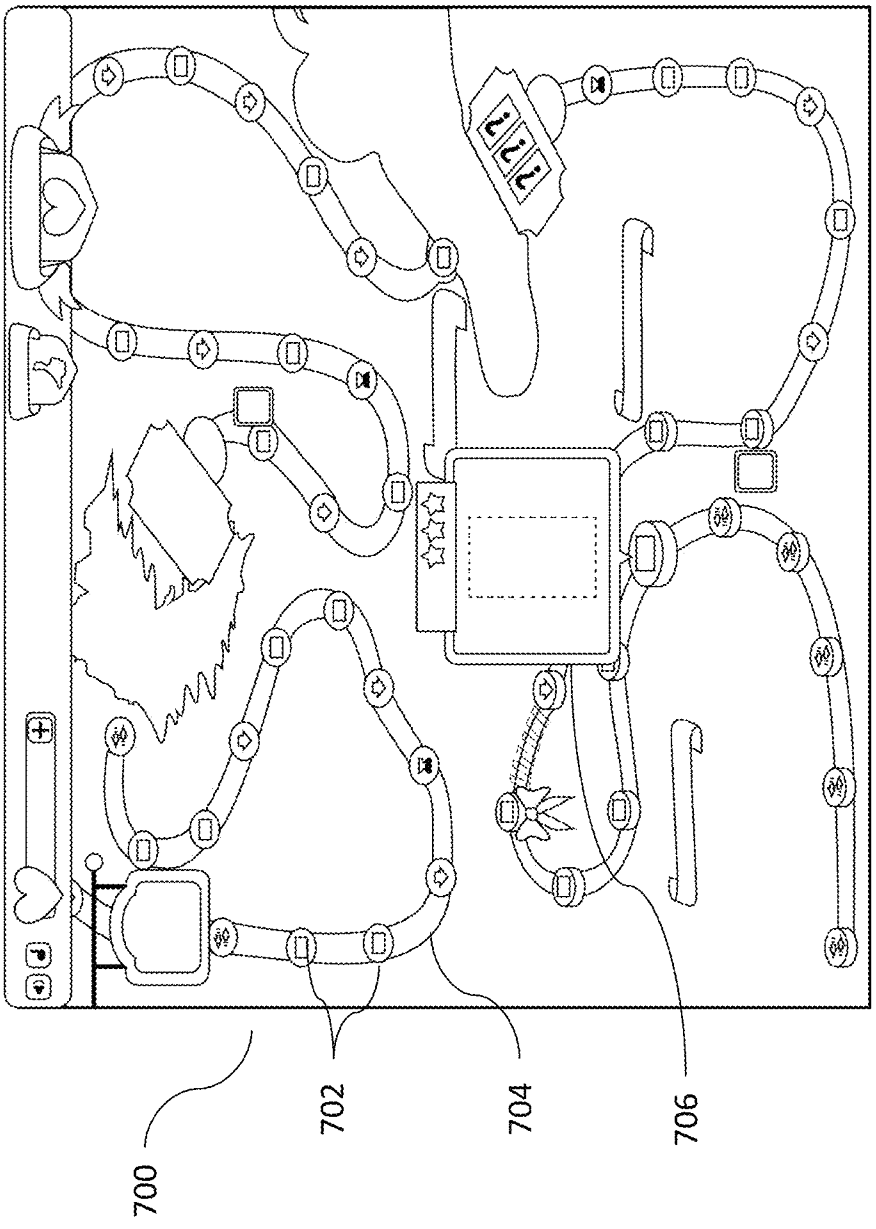
FIG. 4 schematically shows a representation of different levels of a game.

In some embodiments, the different levels may be represented on a map 700. FIG. 4 schematically shows one example of such a view. Different levels 702 are represented on a path 704 so that the user can see the progress which they have made playing the game. The different levels may be displayed in a first manner and/or with first information if the level has not been completed and in a second manner and/or with second information if the level has been completed. For example, the icon used to represent a level which has been completed may be different to that for a level which has not been completed.

In some embodiments, one of the levels which have been completed or not completed is displayed with an indication. The other of the levels which have been completed or not completed may be displayed without the indication. For example, the icons representing a level are the same regardless of whether the level has been completed or not. A separate indication may be displayed next to an icon for a particular level indicating if the level has been completed. Alternatively a separate indication may be displayed next to an icon for a particular level indicating if the level has been not been completed. Alternatively a first separate indication may be displayed next to an icon for a particular level indicating if the level has been not been completed and a second separate indication may be displayed next to an icon for a particular level indicating if the level has been completed.

This map representation may allow a user to go back and replay levels which he has previously played. The map view may show what levels have been completed as well as how many levels are left to play. Throughout the game and for each level completed, the player journeys across the map. In some embodiments, the levels are divided up into groups or chapters or stages. These may be referred to as episodes. In some embodiments, there may be a theme associated with each chapter.

In some embodiments, if the player has connected to a social network, then friends' progress from the same network may be viewed on the map by way of information provided next to the highest level they have currently reached or by way of a league table which can be displayed.

In the map view, the player can hover over a level to display a thumbnail 706 of it. This makes it easier to find specific already completed levels, and can also give the player an idea of what to expect before actually starting a level. In some embodiments, thumbnails can be displayed for any level. In some embodiments, no thumbnails can be displayed for levels that have not yet been reached. In some embodiments, the thumbnail option is not provided.

Information may be provided on the map to display how well the player has done on the level if he has played it previously. This can for instance be represented with the number of stars the player has received on that level, the actual score, or some other indication. This may be done via the thumbnail option, by displaying information on the map or by any other suitable mechanism.

Figure 5:
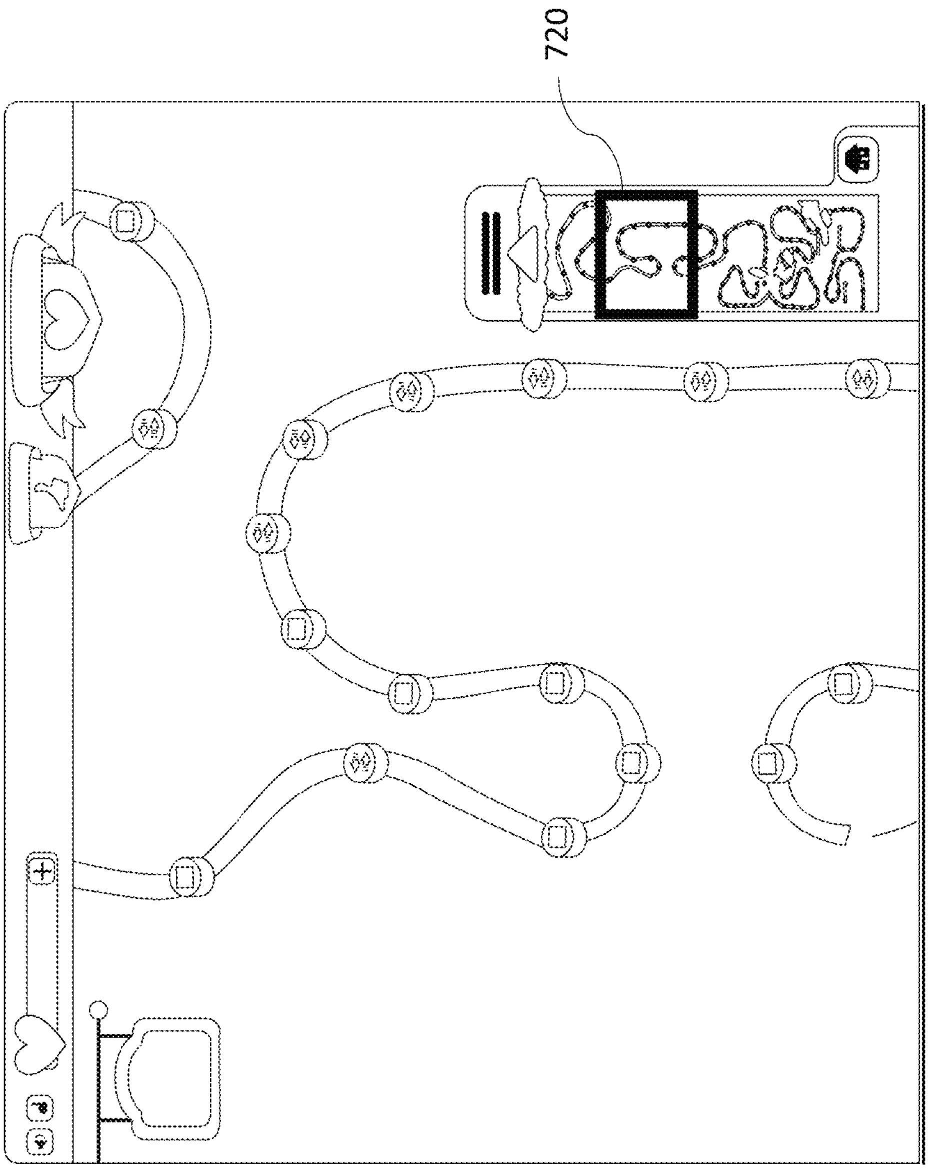
FIG. 5 schematically shows a zoomed representation of some of the different levels of the game.

When navigating on a map in a game, it may sometimes be difficult to find desired level or area of the map if the map is, for example, too large relative to the available display. In some embodiments, for example as shown in FIG. 5, a smaller version 720 of the map is displayed. The user is able to select a part of that map to be displayed on the display such that the part of the map displayed is larger than when the entire map is displayed. The smaller version of the map will highlight the part of the map which is being displayed in enlarged form.

In some embodiments, the smaller version of the map is only in full view when the player needs it; the rest of the time the smaller version of the map may be hidden with only a small part of it showing. Clicking on this small part will expand the smaller version of the map such as shown in FIG. 5 and referenced 720 and let the player use it. Clicking on the same part again will once more hide the smaller version of the map. In this way the user can toggle between the view of FIG. 4 and the view of FIG. 5. When the smaller version of the map is expanded as shown in FIG. 5, the player is provided with a mini map showing an area of the map. The player can select anywhere on the mini map and when doing so the main view will jump to the same location, but zoomed in. The player may also scroll through the mini map which will then simultaneously scroll the map in the main view.

In some embodiments, the game can be implemented so that a player progresses through multiple levels. The different levels may have different levels of difficulty in some embodiments. For example, the trend may be for the levels to become increasingly difficult. However, in some embodiments, the difficulty of individual levels may vary within the progression from easier to harder to easier and so on.

As the player travels through the levels in the game, their progress may be represented as a journey along a path in the virtual map.

In some embodiments, the player moves between levels and completes the levels one by one along a path by playing the associated game. When the player reaches the goal of a level, the next level is unlocked and the player can play that level in the game.

The number of groups and levels can vary depending on the implementation. The levels may be numbered consecutively throughout the game or they can be numbered within a group, it is also understood that other ways of identifying the levels can be provided.

One way of unlocking new groups is to complete the last level on the latest group. The user may in some embodiments be provided with challenges to unlock the next group in the virtual map.

In some embodiments, the user can play any of the unlocked levels on the map, so the user can go back and replay already completed levels to get a better score or beat friends' high scores.

It should be appreciated that the map representation is only one way in which progress in a game may be shown. In other embodiments, for example, a list of levels may be provided with an indication of how far in the list the player has progressed.

Some embodiments are configured to provide a reward to a player.

Some embodiments may provide an engaging, competitive and/or social extension of a game. This may be provided by a game challenge option. Some embodiments may provide this within the game progression of a saga map or other game progression. Other embodiments may provide this outside of a usual game progression of a saga map or other game progression. Some embodiments may provide this in a computer implemented game which does not have a game progression provided by different game levels. Some embodiments may be provided as a stand-alone computer implemented game.

Some embodiments may be provided competitive game play against other players or collaborative game play with other players. In some embodiments, the collaborative game play may simply be the player playing the same challenge alongside other players.

FIGS. 6*a* to 6*e* show an example of completive game play (first game challenge option) and FIGS. 7*a* to 7*g* show an example of collaborative game play (second game challenge option.

In some embodiments, the level associated with a game challenge option may be a given number of levels ahead of the current level of the player or may be associated with a specific level. Where the game challenge option is associated with a given number of levels ahead of the current level, the given number may vary between challenges or may be the same for all challenges. By way of example only, the given number of levels may be for example 2. In other embodiments, the given number of levels may be one or more than 2.

In some embodiments, the level associated with the game challenge option may be associated with a current game level of the player or even a game level which has previously been played and completed by the player.

In some embodiments, the possibility of the game challenge option may not be associated with a specific game level. For example, information may be displayed on the display which indicates the possibility of the first game challenge.

In some embodiments, there may be a limitation of the availability of the game challenge option. Information about the limitation of the availability of the game challenge option may be displayed.

In some embodiments, the limitation may be a time limitation option. The game challenge option may only be available to play for a limited time. A timer of the user device may be configured to count down the given time period. In other embodiments, the timer may provide a count up timer function In some embodiments, the game challenge may only be available within a given time window. In this embodiment, a time information may be provided indicating when the time window starts. Alternatively or additionally, time information may be provided indicating when the time window ends.

In some embodiments, the indication of the availability of the game challenge may be displayed on the progression map until the player reaches the level associated with the game challenge or until the game challenge option is no longer available, whichever occurs first.

In some embodiments, there may be a limitation on the number of players who are able to play the game challenge option.

In some embodiments, the limitation on the number of players may be visualised as a limited number of spots for players to play the game challenge option. These players may not be real time players but may be provided by ghost data for real players. The ghost data is game data which is based on previous game data from real players. In some embodiments, the game data for one or more other players may alternatively or additionally be provided by one or more game bots. In other embodiments, the game data may be real time data from other players of the game, playing at the same time as the current player.

The number of available spots may reduce as a time availability for the game challenge option reduces. The at least one processor may be configured to cause information indicating the number of available spots and/or the number of other players in the game challenge to be displayed on the display. This information may be displayed in conjunction with the saga map and/or whenever the player is playing one of the game levels. In some embodiments, the number of game spots may be used as way to convey an amount of time remaining until the challenge is no longer available. As the remaining time gets less, the number of available spots reduces. In some embodiments, there is a linear progression between time remaining and number of available spots. In other embodiments, the progression between time remaining and the number of remaining spots may be nonlinear. For example the number of available spots falls more quickly as the time remaining reduces. In other embodiments, the progression between time remaining and the number of remaining spots may not appear to have any discern able relationship.

Provided the user achieves the required condition to play the game challenge option within the available time, the user will be provided with a spot to play the game challenge option.

In some embodiments, there may be one or more conditions which need to be satisfied in order for the player to be able to play the game. For example, the player may be required to reach a given game level and/or satisfy one or more game objectives. For example, the user may need to collect a given number of items, score a given number of points and/or any other conditions. In some embodiments, the user may be required to reach the game level which is associated with the starting of the game challenge option by a certain time.

In some embodiments, the game challenge option is associated with the usual game progression levels, for example the different game levels shown on the map. In other embodiments, the game challenge option may be associated with one or more different game levels to the usual game progression game levels.

In some embodiments, the at least one processor may be configured to cause the display to display information on the display indicating the level at which the challenge starts and the level at which the challenge ends. This may be displayed on a map or other game progression or indicated in any other suitable manner.

In some embodiments, a game challenge may have one or more check points in the game challenge. The at least one processor may be configured to cause the display to provide information about the level with which a checkpoint is associated. In some embodiments, this may be displayed on a map or other game progression or indicated in any other suitable manner.

In some embodiments, if a player reaches a level associated with a respective checkpoint, the player may be rewarded, for example with an in game reward.

In some embodiments, the game challenge option may be provided every X game levels. For example, X may be 40 or any other suitable number. In some embodiments, the game challenge option may be provided based on a time related criteria. For example, when the player has played the game for a given amount of time, the game challenge option may be provided. In some embodiments, the game challenge options may be provided in association with specific calendar dates. For example the game challenge option may be provided on weekends and/or public holidays and/or the like.

In some embodiments, there may be a fixed number of players, including the current player at the beginning of the challenge. Each time the player plays a game level of the game challenge option, the at least one processor is configured to determine if the player has successfully completed that game level. If the player has satisfied the goal for the level, the player remains in the game challenge and can proceed to the next game level. If the player has not satisfied the goal of that game level, the game challenge ends for the player.

In some embodiments, a player may only make one attempt in the game challenge option to satisfy the goal associated with a game level. If the player is unsuccessful in that attempt, the game challenge may end for the player. It should be noted, that where the game level is part of the usual game progression, the player is able to replay that game level. However, this will be outside of the game challenge option.

In other embodiments, the player may be provided with n attempts to complete the level in order to progress to the next level of the challenge where n is an integer equal to one or more. In some embodiments, n may be the same for all levels of the challenge. In other embodiments, the value of n may be different for different levels of the challenge. In some embodiments, n may be higher for a harder level as compared to the value of n for an easier level.

In some embodiments, the at least one processor may be configured to cause the display to display to display information about the number of players in game challenge option. This may be based on the ghost data for the other players. In some embodiments, the user device may receive the ghost data from a server. This ghost data may be used by the at least one processor to determine the number of players in the game challenge option.

In some embodiments, the ghost data of other players is based on the corresponding levels which are being played. This may provide a correlation between the difficulty of the current game level and the number of players that fail to complete that current game level.

In other embodiments, where the game challenge option is being played in real time, the server will provide information to the user device indicating how the other players are doing in the game challenge. For example, information may be provided as to the number of players remaining at the end of a given level and/or the number of players failing a level.

In some embodiments, information about the other players may be displayed. For example, information associated with a player who has failed a level and thus out of the game challenge may be displayed in a different way to information associated with a player that has completed the level and hence still in the game challenge.

In some embodiments, avatars associated with the players may be displayed. In some embodiments, a player who has completed the game level will be shown with a border of one colour (for example green) and player who has not managed to complete the game level will be shown a border of a different colour (for example red). Alternatively or additionally, the players who have completed the game level will be shown on one location on the display and players who have not successfully completed the game level may be shown at a different location on the display.

In some embodiments, avatars of the opponents may only be used when the number of remaining opponents is less than a given number.

In some embodiments, different other players may be provided each time the player plays the game challenge. In other embodiments, at least some other players may be the same in more than one game challenges. In some embodiments, none, one, or more other players may be social connections of the player.

Reference is now made to FIGS. 6*a* to 6*e* which show an example of competitive game challenge.

Figure 6B:
FIG. 6*b* shows an image displayed on the display of the user device inviting the user to play the first game challenge option.
Figure 6A:
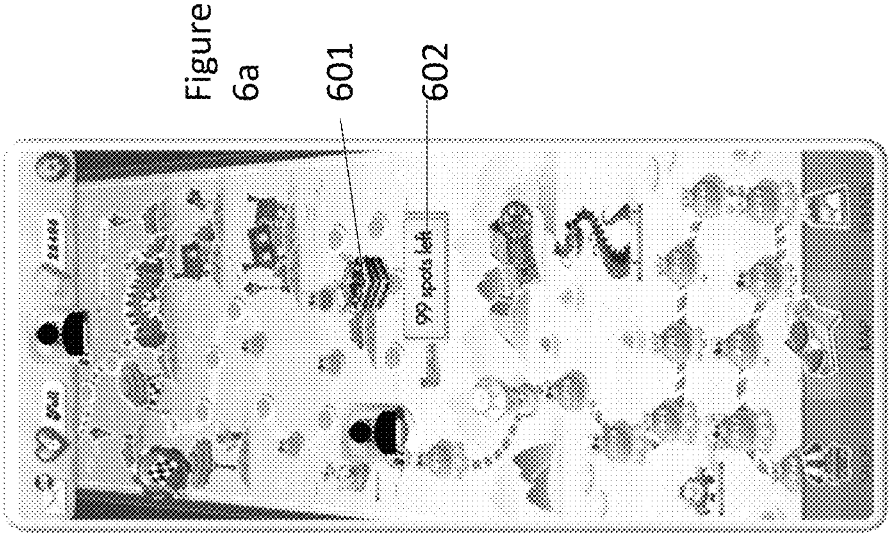
FIG. 6*a* shows an image displayed on the display of a user device showing the availability of a first game challenge option.

Reference is first made to FIG. 6*a* which shows an example of a screen which is displayed on the display of a user device configured to provide the example computer implemented game providing a first game challenge. At least one processor of the user device is configured to control the display to display the image on the display of the user device.

The at least one processor is configured to cause information indicating the possibility of a first game challenge option. In the example shown in FIG. 6*a*, the information 601 is displayed in association with one of the levels which has yet to be played. In this example, the information is visualised as palace. In other embodiments, the information be visualised in any other suitable way using an image and/or text.

In the example shown in FIG. 6*a*, the game challenge option is available for a limited time and the player has to reached a given game level within that limited time. This may be visualised as a limited number of game spots 602 such as described previously. The at least one processor may be configured to display information associated with the given game level indicating the availability of the game challenge option when the player reaches that game level. Time information and/or the number of game spots remaining (or taken) may be displayed on the display.

The at least one processor is configured to determine if the player is able to play the first game challenge option. When it is determined by the at least one processor that the player is able to play the game challenge option, the at least one processor is configured to cause the display to display information indicating this. For example, where the at least one processor has determined that the player has reached the given game level within the limited time (for example getting a game challenge spot), an indication that the user is able to play the game option is displayed. One example of a screen displayed on the display indicating to the user that they are able to play the game challenge option is shown in FIG. 6*b*. The player maybe required to select a play option via the user interface of the user device in order to be able to play the game challenge option. The play option 610 shown in FIG. 6*b* may be a clickable area. In other embodiments, the player may be taken directly to the game challenge option when the at least one processor determines that the player is able to play the game challenge option.

Figure 6C:
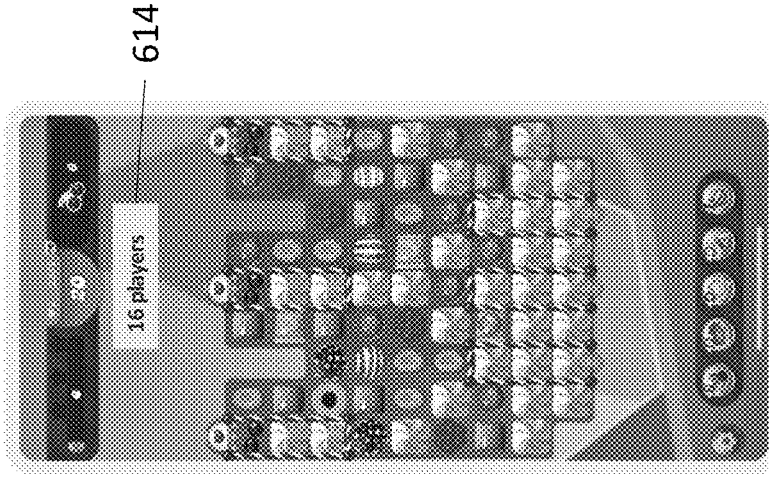
FIG. 6*c* shows an image displayed on the display of the user device showing an example game board during the playing of the first game challenge option.

Reference is made to FIG. 6*c* which shows an example screen which is displayed in some embodiments. The player has started the game challenge option. In some embodiments, the game challenge option is to play a series of game levels with other players. The at least one processor may be configured to cause the display to display information 614 indicating the remaining number of players. In this example, the information is displayed as a banner above the game board.

The at least one processor is configured to determine which of the other players in the game challenge successfully completed the level and/or failed the game level. This may be done when the player has reached the end of the respective level. In other embodiments, this determination may be done iteratively while the game level is being played. This would mean that the information 614 would be updated while the game level is being played. In some embodiments, the at least one processor may determine from the ghost data how many players in the game challenge option fail the current level and cause the information which is displayed to be updated while the game level is being played.

Figure 6D:
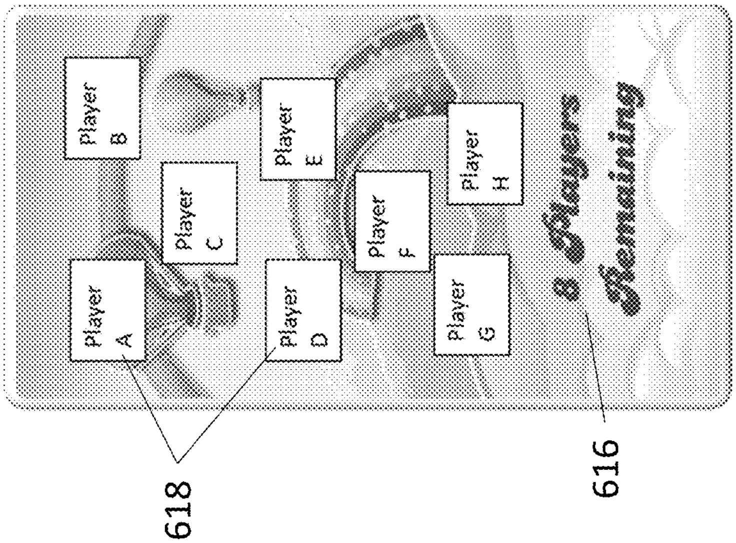
FIG. 6*d* shows an image displayed on the display of the user device showing a number of players remaining at the end of a level of the first game challenge option.

In some embodiments, when a player completes a level, information about the remaining number of players may be shown. For example as shown in FIG. 6*d*, an indication 616 about the number of players is displayed along with avatars 618 and/or other information associated with the other players.

In some embodiments, after a game level is completed, the at least one processor may be configured to cause the display to display an animation removing players who lost and put the focus on the players who are still alive. This may end with the screen shown in FIG. 6*d*.

If the player loses a level, the at least one processor may be configured to cause the display to display information showing how many opponents that were beaten. The game challenge option will end for the player.

In some embodiments, as the player gets closer to a finish and/or when the number of opponents is below a given amount, more information is provided about the opponents. For example, when the number of other players remaining in the game challenge is down to, for example 10, the name of the opponent and/or the avatar may be provided.

In some embodiments, if the player wins the game challenge, the player may be provided with one or more game rewards. For example, the player may be provided with one or more game boosters and/or in game currency. In some embodiments, the player may be provided with an indicator associated with their avatar which indicates to other players that the player has won a game challenge. In some embodiments, this indicator is visualised as a crown. In this regard, reference is made to FIG. 6*e* which shows a screen displayed on the display when the player has won the game challenge. The avatar 622 of the player is displayed with an indicator in the form of a crown 620.

In other embodiments, this indicator may take any other suitable form such as a medal or a frame around the avatar and/or in any other suitable way.

In some embodiments, the player's avatar with the indicator will be displayed to other players.

In some embodiments, the indicator may be upgraded if the player wins further game challenges. For example, different crowns are used depending on the number of game challenges which the player has one.

In some embodiments, there may be a finite limit to how many levels there are in a game challenge option. In some embodiments, there may be a fixed number of levels in a game challenge option. In other embodiments, the number of levels may be dependent on a difficulty associated with the current levels being played. Where the levels are divided into sets such as episodes, the number of levels may depend on the difficulty associated with the current set of game levels.

In some embodiments, if the player gets to the last one of the limited number of levels of the game challenge option and successfully completes that level, then that player will have won that game challenge.

In some embodiments, a difficult game level will result in more players being knocked out of the game challenge as compared to an easier game level. The saga episode difficulty may change how many game levels are needed to win.

In some embodiments, the number of players alive is translated into a number of tiers. By way of example only, the number of tiers may be 10. However it should be appreciated that in other embodiments, there may be more than 10 tiers or less than 10 tiers.

In some embodiments, there may be a one to one relation between tiers and game levels.

In other embodiments, the level difficulty determines how many tiers are passed by the player when that level is successfully completed.

One example is given below where the total number of players in the game challenge is 100. This is by way of example only and other challenges may have a different total number of players. A translation is made of the number of players "alive" into 10 tiers, for example as given below.

| Tier | Number of players |
|---|---|
| 10 | 95 to 100 |
| 9 | 67 to 94 |
| 8 | 45 to 66 |
| 7 | 29 to 44 |
| 6 | 20 to 28 |
| 5 | 15 to 19 |
| 4 | 11 to 14 |
| 3 | 7 to 10 |
| 2 | 4 to 6 |
| 1 | 2 to 3 |

In the following example, the first level of the of the game challenge is classified as a hard level. If they player completes that level, the player will move two tiers to tier 8. In this example, based on the ghost data, 57 players are remaining.

The next level of the game challenge is classified as a very hard level. If they player completes that level, the player will move three tiers to tier 5. In this example, based on the ghost data, 17 players are remaining.

The next level of the game challenge is classified as a normal level. If they player completes that level, the player will move one tier to tier 4. In this example, based on the ghost data, 12 players are remaining.

The next level of the game challenge is classified as a normal level. If they player completes that level, the player will move one tier to tier. In this example, based on the ghost data, 10 players are remaining.

The next level of the game challenge is classified as a hard level. If they player completes that level, the player will move two tiers to tier 1. In this example, based on the ghost data, 3 players are remaining.

There is one final level of the game level. If the player completes that level, the player will win that game challenge. In some embodiments, the final level may always be a hard or very hard level.

It should be appreciated that some computer implemented games may provide both competitive game play challenges and collaborative game play challenges.

In some embodiments, the player may be presented with an option to choose to play the game challenge option as a competitive game challenge option.

It should be appreciated that the first game challenge may be modified to include one or more of the features discussed in relation to the second game challenge. This may be in addition or as an alternative to one or more features of the first game challenge option.

It should be appreciated that the second game challenge may be modified to include one or more of the features discussed in relation to the first game challenge. This may be in addition or as an alternative to one or more features of the second game challenge option.

Reference is now made to FIGS. 7*a* to 7*g* which show an example of collaborative game challenge. In this example, the game challenge can be considered to be a community based event such as a "running of the bulls" type of event. A "bubble-gum troll" starts a flood of "bubble-gum" and it is a challenge to see how far the currently player and other players can get before getting "stuck" or by failing a level.

The player can see other players playing/losing. In contrast to the completive game challenge, it is not about being the absolute last player standing.

Some embodiments may provide rewards at checkpoints levels from the start of the game challenge. In some embodiments the checkpoints may be at levels 1, 3, and 5. This is by way of example only. More or less than three checkpoints may be provided. The checkpoints may be at any suitable level.

The one or more checkpoints other than the last checkpoint may have a reward such as booster if that level associated with that checkpoint is completed.

The last checkpoint may be associated with the last level of the game challenge. This may be associated with a reward, where all players who reach that last level get to "share". The reward may be gold bar jackpot or any other in game rewards.

At the last checkpoint, the player is safe. The wave of bubble gum may fade out.

Figure 7A:
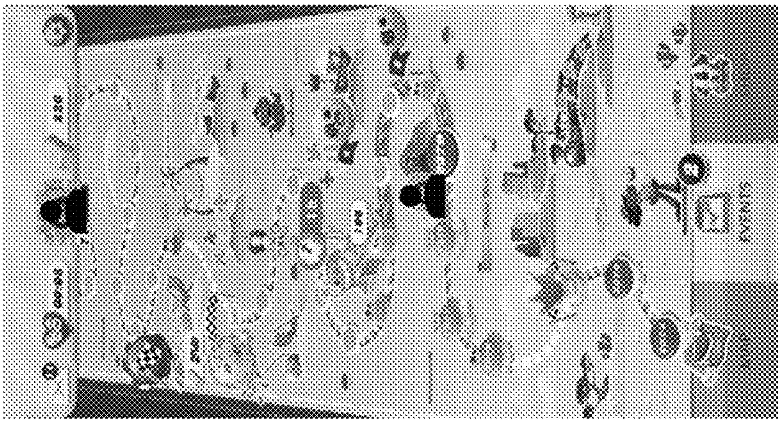
FIG. 7*a* shows an image displayed on the display of the user device showing the availability of a second game challenge option.
Figure 6E:
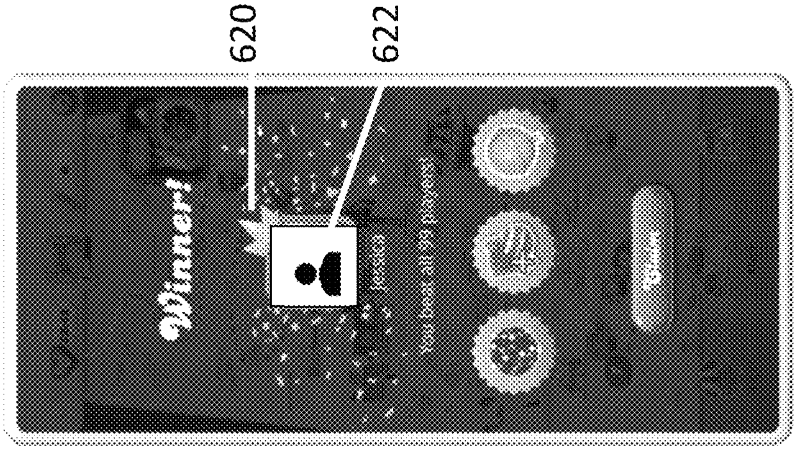
FIG. 6*e* shows an image displayed on the display of the user device when the player has won the first game challenge option.

Reference is first made to FIG. 7*a* which shows an example of a screen which is displayed on the display of a user device configured to provide the example computer implemented game providing a second game challenge. At least one processor of the user device is configured to control the display to display the image on the display of the user device.

Figure 7C:
FIG. 7*c* shows an image displayed on the display of a user device inviting the user to play the second game challenge option.
Figure 7B:
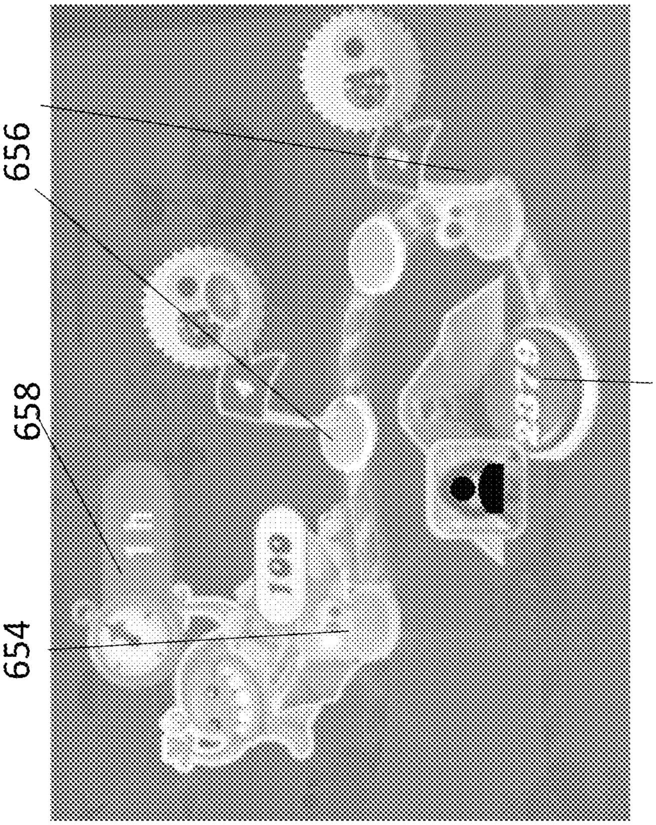
FIG. 7*b* shows a zoomed in view of part of the image of FIG. 7*a;*

The at least one processor is configured to cause information indicating the possibility of a second game challenge option. FIG. 7*b* shows a zoomed in part of the image shown in FIG. 7*a*. FIGS. 7*a* and 7*b* show a current level 650 of the player which is the start of the second game challenge option and the level 654 at which the second game challenge ends. Information may be displayed indicating the reward available if the game challenge is completed. This information may be displayed alongside the level at which the challenge ends or in any other suitable location. In the example shown in FIGS. 7*a* and 7*b*, the information shows the reward, which is available, that is a share of 100 gold bars.

In the example shown in FIGS. 7*a* and 7*b*, the game challenge option is available within a time window. The player can play the game challenge provided the player reaches the level of the game challenge and the time window has not ended. This may be visualized by a timer 658 showing a remaining time of the time window. It should be appreciated that in some embodiments, the game challenge ends when the time window ends, even if there are still levels of the game challenge available to the player.

Optionally, one or more checkpoints 656 may be indicated. For example if the level associated with a checkpoint is completed, the player may be provided with a reward such an in game reward. Information may be displayed indicating the reward available if that level of the game challenge is completed. This information may be displayed alongside the respective check point level or in any other suitable location. In the example shown in FIGS. 7*a* and 7*b*, the information shows the rewards which are available, that is game boosters.

The last level of the game challenge may be regarded as being a checkpoint. The levels at which rewards may be provided may be the second, fourth and fifth levels.

As can be seen from FIGS. 7*a* and 7*b*, the path between the levels of the game challenge may be displayed in a visually distinct manner as compared to the path between levels which are not part of game challenge.

The at least one processor is configured to determine if the player is able to play the second game challenge option. When it is determined by the at least one processor that the player is able to play the second game challenge option, the at least one processor is configured to cause the display to display information indicating this. For example, where the at least one processor has determined that the player has reached the given game level within the limited time, an indication that the user is able to play the game option is displayed. One example of a screen displayed on the display indicating to the user that they are able to play the game challenge option is shown in FIG. 7*c*. The player may be required to select a play option 660 via the user interface of the user device in order to be able to play the game challenge option. The play option 660 shown in FIG. 7*c* may be a clickable area. In other embodiments, the player may be taken directly to the game challenge option when the at least one processor determines that the player is able to play the game challenge option.

In the example shown in FIG. 7*c*, the screen provides information as to the reward for the player if the player completes the challenge.

Figure 7E:
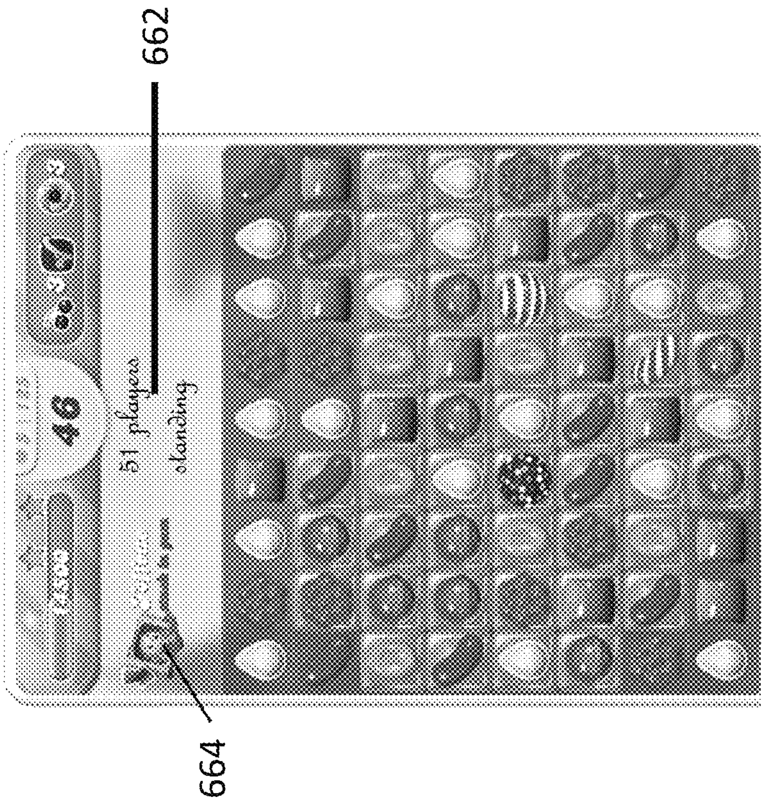
FIG. 7*e* shows an image displayed on the display of the user device showing an example game board during the playing of the second game challenge option.
Figure 7D:
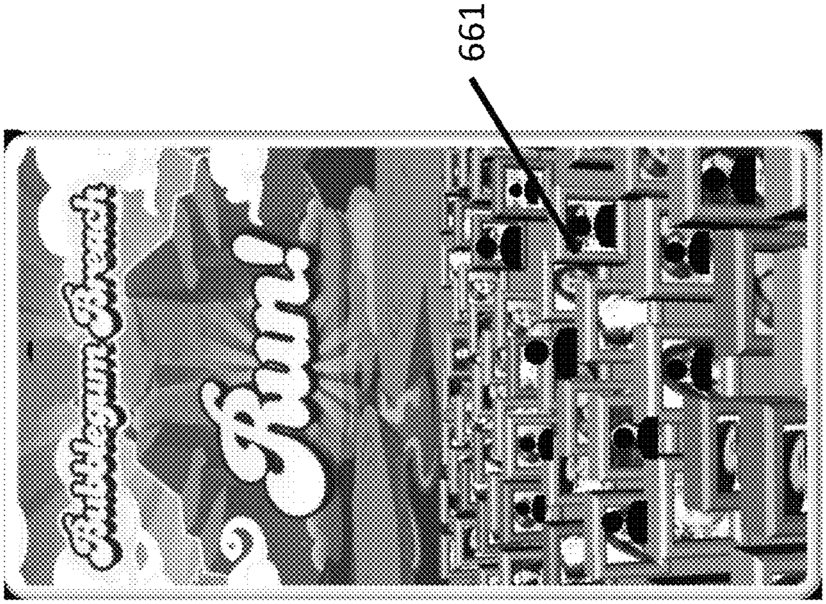
FIG. 7*d* shows an image displayed on the display of the user device showing the other players of the second game challenge option.

In some embodiments, after the clickable area 660 shown in FIG. 7*c* is selected by the user, the user is taken to the screen shown in FIG. 7*d* which shows the other players 661 with are also taking part in the same game challenge. In this example, the game challenge is conceptualised as a run where the player runs with other players to escape from a flow of, for example, bubble-gum.

Reference is made to FIG. 7*e* which shows an example screen which is displayed in some embodiments. The player has started the game challenge option. In some embodiments, the game challenge option is to play a series of game levels with other players. The at least one processor may be configured to cause the display to display information 662 indicating the remaining number of players. In some embodiments, information 664 about the failing of the other players of that level may be provided. For example, information in the form of an avatar may be briefly be displayed for each other that level failing that level.

The at least one processor is configured to determine which of the other players in the game challenge successfully completed the level and/or failed the game level. In some embodiments such as shown in FIG. 7*e*, this determination may be done iteratively while the game level is being played. This would mean that the information indicating the remaining number of players 662 and/or information 664 about the failing of the other players of that level would be updated while the game level is being played. In some embodiments, the at least one processor may determine from the ghost data how many players in the game challenge option fail the current level and cause the information which is displayed to be updated while the game level is being played.

Alternatively, this updating may be done when the player has reached the end of the respective level.

Figure 7F:
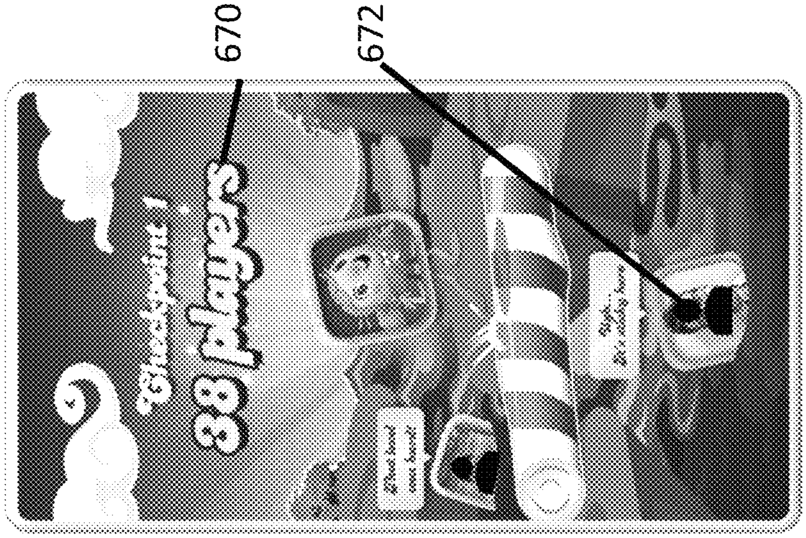
FIG. 7*f* shows an image displayed on the display of the user device showing a number of players remaining at the end of a checkpoint of the second game challenge option.

In some embodiments, when a player completes a level, information about the remaining number of players may be shown. For example as shown in FIG. 7*f*, an indication 670 about the number of players is displayed along with avatars 672 and/or other information associated with the other players. In the example shown in FIG. 7*f*, there are 38 remaining players so only the avatars of a few of those players are shown. In this example, the level completed in that of the first check point. In some embodiments, a screen such as shown in FIG. 7*f* is only shown when a checkpoint level is completed. In other embodiments, a screen such as shown in FIG. 7*f* is shown whenever a level of the game challenge is completed.

In some embodiments, if the player wins the game challenge, the player may be provided with a share of the game rewards with any of the other players who have also completed the game challenge. For example, the reward may be 40 gold bars. In the example screen shown in FIG. 7*g*, there are 8 players 673 including the current player who have completed the game challenge. Accordingly each player is shown as receiving 5 gold bars. Where the other player data is based on ghost data, the other players may or may not receive those 5 gold bars.

In some embodiments, the size of the reward which is to be shared may be dependent on the difficulty of the players. The size of the reward may be selected such that for a game challenge with harder levels, the reward which is generally received by a player will be larger than reward which is provided by a game challenge with easier levels. In some embodiments, the size of the reward to be shared may be the same for different challenges. In some scenarios this may lead to a player receiving a larger share of the reward if the game challenge has harder levels as fewer players will complete the challenge as compared to a game challenge with easier levels.

Figure 7G:
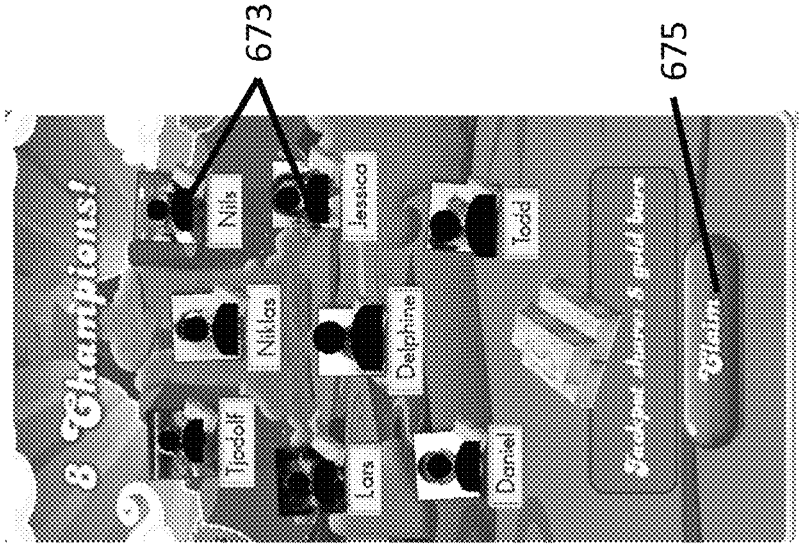
FIG. 7*g* shows an image displayed on the display of a user device at the end of the second game challenge options showing the players who have completed the game.

As can be seen in the example screen shown in FIG. 7*g*, an avatar for each of the players (optionally including the current player) is displayed along with an indication as their share of the game reward. The game reward make any suitable form such as one or more game boosters and/or in game currency.

In some embodiments, the player may be provided with an indicator associated with their avatar which indicates to other players that the player has won a game challenge. This may be as described previously.

In some embodiments, the screen has a selectable or clickable area 675 which needs to be selected by user input via the user interface. When the area 675 is selected, the player is able to claim or receive their share of the rewards.

Figure 8:
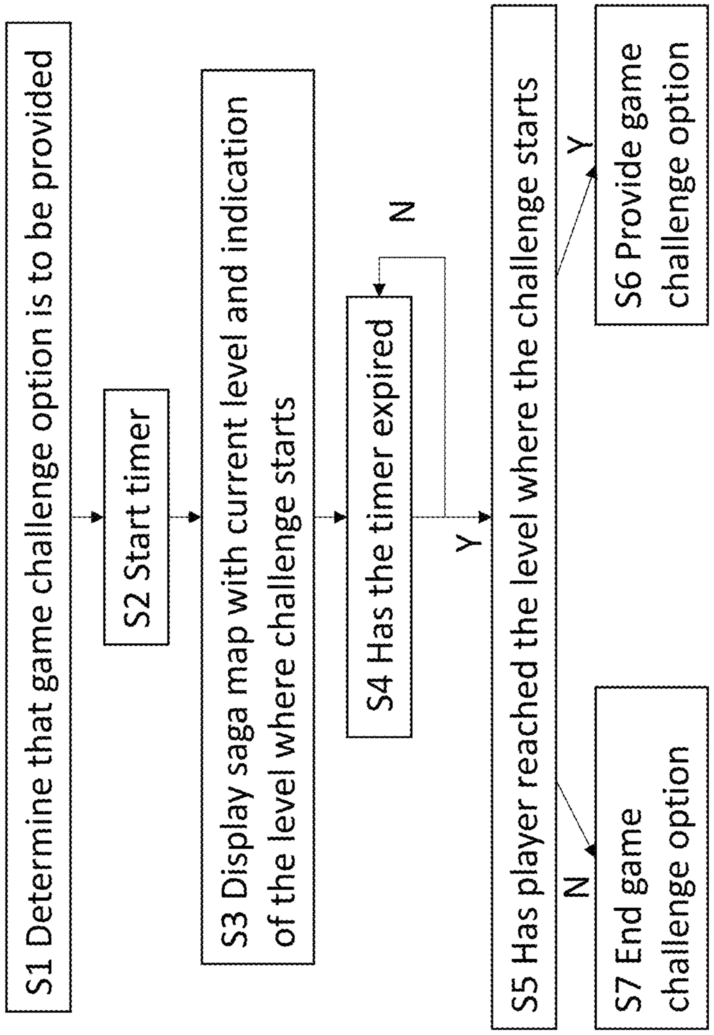
FIG. 8 shows a method of some embodiments.

Reference is made to FIG. 8 which shows a method flow of some embodiments.

In step S1, the at least one processor is configured to determine that the game challenge option is to be provided.

In step S2, the at least one processor is configured to cause a timer is started. In this example, the user needs to reach a given level before the timer expires.

In step S3, the at least one processor is configured to cause the display to display a saga map or other game progressions. This map may show the current level of the user and an indication of the level at which the challenge starts. This may be provided in any suitable way such as an indicator on the saga map adjacent the level at which the game challenge starts.

In some embodiments, step S2 may take place after step S3, before step S3, or at the same time as step S3.

In step S4, the at least one processor is configured to determine if the timer has expired.

If not, the at least one processor is configured to repeat step S4 until it is determined that the timer has expired.

In step S5, if the timer has expired, the at least one processor is configured to determine if the user has reached the level where the challenge starts.

If so, the next step is step S6. The at least one processor is configured to provide the game challenge option.

If not, the next step is step S7. The at least one processor is configured to end the game challenge option. The at least one processor may be configured to cause the indication of the game challenge option to be removed from the display.

In some embodiments, step S4 may take place after step S5 but before steps S6 and step S7.

In some embodiments, the timer may be configured to provide information indicating that the timer has expired. In this alternative, step S4 may comprise receiving an indication that the timer has expired.

Figure 9:
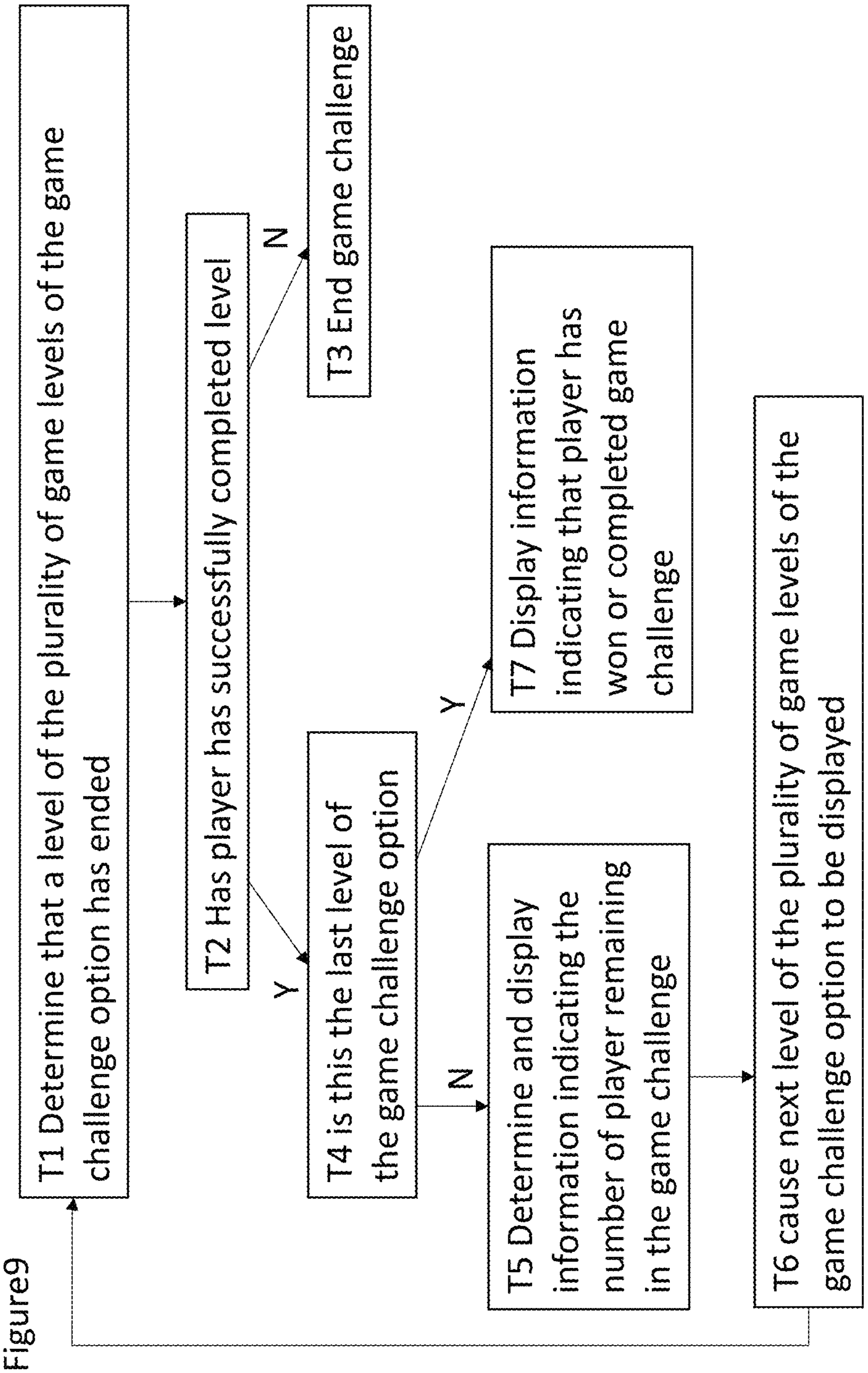
FIG. 9 shows another method of some embodiment.

Reference is made to FIG. 9 which shows a method flow of some embodiments.

In step T1, the at least one processor is configured to determine that a level of the plurality of game levels of the game challenge option has ended.

In step T2, the at least one processor is configured to determine if the play has successfully completed the level.

If it is determined in step T2 that the player has not successfully completed that game level, the next step is step T3 in which the game challenge is ended.

If it is determined by the at least one processor in step T2 that the player has successfully completed that game level, the next step is step T4 in which the at least one processor is configured to determine if this is the last level of the game challenge option.

If it is determined in step T4 that this is the last level of the game challenge option, the next step is step T7. In step T7, the at least one processor is configured to cause the display to display information indicating that the player has won or completed the game challenge.

If it is determined in step T4 that this is not the last level of the game challenge option, the next step is step T5. In step T5, the at least one processor is configured to determine and display information indicating that the number of players remaining in the game challenge. The at least one processor may perform the determination as to the number of remaining players iteratively while the player is player is playing the level or at the end of that level.

Step T5 is followed by step T6. The at least one processor may be configured to cause the next level of the game challenge option to be displayed. In some embodiments, this may be responsive to user input received via the user input to select the next level of the game challenge option. In some embodiments, the player may be returned to the map view and the player selects the next level to play by interacting with an area on the map view associated with that next level. Step T6 is followed by step T1.

In some embodiments, the game is divided into sets of levels, as previously discussed. These sets of levels may be referred to as episodes. In some embodiments, the game challenge may only be available if the user has completed x episodes, where x is an integer greater than or equal to one. It should be appreciated that x may be fixed for the game (i.e. the value of x is the same every time the game is played) or may be varied over time. The value of x may be varied randomly over time. In other embodiments, x is always the same. In other embodiments, the requirement for the availability may be that the player has reached level y where y is an integer. It should be appreciated that y may be fixed for the game or vary over time. The value of y may be varied randomly over time.

The example game challenges have been described as having the current player and 99 other players at the beginning of a game challenge. This is by way of example and different embodiments may have different numbers of players at the beginning of a challenge.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided, and embodied by means of an appropriate carrier medium. An appropriate computer program can be embodied on a computer readable record medium. A possibility is to download the program code product via a data network. In general, the various embodiments may be implemented in hardware or special purpose circuits, software, logic, or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer device configured to provide a computer implemented match game, the computer device comprising a display, a user interface, at least one memory, and at least one processor wherein:

the at least one processor is configured to determine that a game challenge is to be provided, the game challenge starting with a plurality players including a user of the computer device and comprising a defined number of consecutive game levels, wherein if a player fails a game level of the consecutive game levels on a first attempt, that player is removed from the game challenge;

the at least one processor is configured to cause the display to display a first level of the defined number of consecutive game levels and to receive user input from the user of the computer device to play the first level;

the at least one processor is configured to determine which one or more of the plurality of players has failed to complete the first level of the consecutive levels on a first attempt of that level and is to be removed from the game challenge;

the at least one processor is configured to cause the display to display a respective avatar for one or more of the players which are to be removed from the game and a respective avatar for one or more of the players which have completed the first level and are still in the game challenge;

where the user of the computer device has completed the first level on the first attempt of that level, the at least one processor is configured for the next one of the defined number of consecutive levels, to a) cause the display to display a next level of the consecutive game levels;

b) receive user input from the user of the computer device to play the next level;

c) determine which one or more of the remaining players of the plurality of players has failed to complete the next level on a first attempt of that level and is to be removed from the game challenge; and d) cause the display to display a respective avatar of one or more of the players which are to be removed from the game and a respective avatar of one or more of the players which have completed the first level and are still in the game challenge;

wherein steps a) to d) are repeated for each of the remaining ones of the consecutive levels when the user of the computer device has completed the previous one of the consecutive levels on a first attempt;

wherein, when the user has completed each of the consecutive levels, the at least one processor is configured to determine a share of an in game reward for the user, the share of the in game reward being dependent on a number of the plurality of players determined to have successfully completed each of the consecutive levels of the game challenge and to cause the display to display information about the in game reward and an avatar for one or more players who have also successfully completed each of the plurality of consecutive levels of the game challenge.

2. The computer device as claimed in claim 1, wherein the at least one processor is configured to cause the display to display information indicating that the game challenge is available to the user of the computer device.

3. The computer device as claimed in claim 1, wherein the at least one processor is configured to cause the display to display a user selectable area and in response to user input selecting the user selectable area cause the game challenge to be started.

4. The computer device as claimed in claim 1, wherein the at least one processor is configured to determine that the user of the computer is able to play the game challenge and to cause the display to display an option which when selected starts the game challenge.

5. The computer device as claimed in claim 4, wherein the option, which when selected starts the game challenge, comprises a clickable area.

6. The computer device as claimed in claim 1, wherein the at least one processor is configured to cause the display to display information about the in game reward associated with the game challenge.

7. The computer device as claimed in claim 1, wherein the at least one processor is configured to cause the respective avatar of one or more of the players which are to be removed from the game to be displayed in a different way to the respective avatar of one or more of the players which have completed a respective level of the game challenge and are still in the game challenge.

8. The computer device as claimed in claim 1, wherein the at least one processor is configured to cause the respective avatar of one or more of the players which are to be removed from the game to be displayed in a different location to the respective avatar of one or more of the players which have completed a respective level of the game challenge and are still in the game challenge.

9. The computer device as claimed in claim 1, wherein the at least one processor is configured to cause the display to display at an end of a respective level, a remaining number of the plurality of players in the game challenge.

10. The computer device as claimed in claim 1, wherein the game challenge starts with one hundred players.

11. The computer device as claimed in claim 1, wherein the at least one processor is configured to use ghost data associated with the plurality of players starting the game challenge, other than the user of the computer device.

12. The computer device as claimed in claim 11, wherein the computer device is configured to receive the ghost data from a server.

13. The computer device as claimed in claim 1, wherein the game challenge is available for a limited time and the at least one processor is configured to cause the display to display information as to a remaining amount of time associated with the game challenge.

14. A computer method providing a computer implemented match game, the method being provided by a computer device configured to provide the computer implemented match game and comprising a display, a user interface, at least one memory, and at least one processor, the method comprising:

determining, by the at least one processor, that a game challenge is to be provided, the game challenge starting with a plurality players including a user of the computer device and comprising a defined number of consecutive game levels, wherein if a player fails a game level of the consecutive game levels on a first attempt, that player is removed from the game challenge;

causing, by the at least one processor, the display to display a first level of the defined number of consecutive game levels;

receiving, by the at least one processor, user input from the user of the computer device to play the first level;

determining, by the at least one processor, which one or more of the plurality of players has failed to complete the first level of the consecutive levels on a first attempt of that level and is to be removed from the game challenge;

causing, by the at least one processor, the display to display a respective avatar for one or more of the players which are to be removed from the game and a respective avatar for one or more of the players which have completed the first level and are still in the game challenge;

where the user of the computer device has completed the first level on the first attempt of that level, the method comprises, by the at least one processor, for the next one of the defined number of consecutive levels, a) causing, by the at least one processor, the display to display a next level of the consecutive game levels;

b) receiving, by the at least one processor, user input from the user of the computer device to play the next level;

c) determining, by the at least one processor, which one or more of the remaining players of the plurality of players has failed to complete the next level on a first attempt of that level and is to be removed from the game challenge;

d) causing, by the at least one processor, the display to display a respective avatar of one or more of the players which are to be removed from the game and a respective avatar of one or more of the players which have completed the first level and are still in the game challenge;

wherein steps a) to d) are repeated for each of the remaining ones of the consecutive levels when the user of the computer device has completed the previous one of the consecutive levels on a first attempt; wherein, when the user has completed each of the consecutive levels, the method comprises determining, by the at least one processor, a share of an in game reward for the user, the share of the in game reward being dependent on a number of the plurality of players determined to have successfully completed each of the consecutive levels of the game challenge and causing, by the at least one processor, the display to display information about the in game reward and an avatar for one or more players who have also successfully completed each of the plurality of consecutive levels of the game challenge.

15. The computer method as claimed in claim 14, wherein the method comprises causing, by the at least one processor, the display to display information indicating that the game challenge is available to the user of the computer device.

16. The computer method as claimed in claim 14, wherein the method comprises causing, by the at least one processor, the display to display a user selectable area and in response to user input selecting the user selectable area cause the game challenge to be started.

17. The computer method as claimed in claim 14, wherein the method comprises determining, by the at least one processor, that the user of the computer is able to play the game challenge and to cause the display to display an option which when selected starts the game challenge.

18. The computer method as claimed in claim 14, wherein the method comprises causing, by the at least one processor, the respective avatar of one or more of the players which are to be removed from the game to be displayed in a different way to the respective avatar of one or more of the players which have completed a respective level of the game challenge and are still in the game challenge.

19. The computer method as claimed in claim 14, wherein the method comprises causing, by the at least one processor, the respective avatar of one or more of the players which are to be removed from the game to be displayed in a different location to the respective avatar of one or more of the players which have completed a respective level of the game challenge and are still in the game challenge.

20. A non-transitory computer readable medium encoded with instructions for controlling a computer device, in which the instructions when executed on at least one processor of the computer device enable the at least one processor to execute a method causing the computer device to be configured to provide a computer implemented match game, the method comprising:

determining that a game challenge is to be provided, the game challenge starting with a plurality players including a user of the computer device and comprising a defined number of consecutive game levels, wherein if a player fails a game level of the consecutive game levels on a first attempt, that player is removed from the game challenge;

causing a display of the computer device to display a first level of the defined number of consecutive game levels;

receiving user input from the user of the computer device to play the first level;

determining which one or more of the plurality of players has failed to complete the first level of the consecutive levels on a first attempt of that level and is to be removed from the game challenge;

causing the display to display a respective avatar for one or more of the players which are to be removed from the game and a respective avatar for one or more of the players which have completed the first level and are still in the game challenge;

where the user of the computer device has completed the first level on the first attempt of that level, the method comprises, for the next one of the defined number of consecutive levels, a) causing the display to display a next level of the consecutive game levels;

b) receiving user input from the user of the computer device to play the next level;

c) determining which one or more of the remaining players of the plurality of players has failed to complete the next level on a first attempt of that level and is to be removed from the game challenge;

d) causing the display to display a respective avatar of one or more of the players which are to be removed from the game and a respective avatar of one or more of the players which have completed the first level and are still in the game challenge;

wherein steps a) to d) are repeated for each of the remaining ones of the consecutive levels when the user of the computer device has completed the previous one of the consecutive levels on a first attempt;

wherein, when the user has completed each of the consecutive levels, the method comprises determining a share of an in game reward for the user, the share of the in game reward being dependent on a number of the plurality of players determined to have successfully completed each of the consecutive levels of the game challenge and causing the display to display information about the in game reward and an avatar for one or more players who have also successfully completed each of the plurality of consecutive levels of the game challenge.

* * * * *